United States Patent
Stallone et al.

(10) Patent No.: US 9,059,617 B2
(45) Date of Patent: Jun. 16, 2015

(54) CONNECTION ARRANGEMENT FOR WINDINGS OF ELECTRIC MACHINES

(75) Inventors: Francesco Stallone, Minusio (CH); Hossein Safari Zadeh, Othmarsingen (CH); Konstantinos Ballos, Kölliken (CH); Johann Haldemann, Birr (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 182 days.

(21) Appl. No.: 13/612,670

(22) Filed: Sep. 12, 2012

(65) Prior Publication Data

US 2013/0069458 A1 Mar. 21, 2013

(30) Foreign Application Priority Data

Sep. 13, 2011 (EP) ..................................... 11181096

(51) Int. Cl.
*H02K 3/28* (2006.01)
*H02K 3/50* (2006.01)

(52) U.S. Cl.
CPC ............ *H02K 3/505* (2013.01); *H02K 2203/09* (2013.01)

(58) Field of Classification Search
CPC .......................... H02K 2203/09; H02K 3/505
USPC ................................... 310/71, 179
See application file for complete search history.

(56) References Cited

U.S. PATENT DOCUMENTS

| | | | | |
|---|---|---|---|---|
| 2,683,227 A * | 7/1954 | Beckwith | ........................ | 310/55 |
| 4,254,352 A | 3/1981 | Fidei et al. | | |
| 4,629,917 A * | 12/1986 | Brem | ............................... | 310/59 |
| 4,636,677 A * | 1/1987 | Yasuhara | ....................... | 310/194 |
| 4,943,749 A * | 7/1990 | Ponce et al. | ................... | 310/260 |
| 6,707,186 B2 * | 3/2004 | Oppitz | ............................ | 310/71 |
| 7,489,058 B2 * | 2/2009 | Drubel et al. | ................... | 310/71 |
| 7,557,478 B2 * | 7/2009 | Hoshika | .......................... | 310/71 |
| 7,595,572 B2 * | 9/2009 | Haga et al. | ...................... | 310/71 |
| 2001/0052734 A1 * | 12/2001 | Shimamoto et al. | ............ | 310/71 |
| 2002/0057067 A1 | 5/2002 | Steinbrink | | |
| 2003/0132674 A1 * | 7/2003 | Shimamoto et al. | ............ | 310/71 |
| 2006/0208587 A1 * | 9/2006 | Herlet et al. | ..................... | 310/71 |
| 2007/0188030 A1 | 8/2007 | Drubel et al. | | |
| 2009/0309432 A1 * | 12/2009 | Bouiller et al. | ................. | 310/54 |
| 2010/0156208 A1 * | 6/2010 | Schaflein et al. | ............... | 310/71 |

FOREIGN PATENT DOCUMENTS

| | | |
|---|---|---|
| EP | 2312730 A1 | 4/2011 |
| JP | 55-128470 U | 9/1980 |
| JP | 61210852 A | 9/1986 |
| JP | 2002-532046 A | 9/2002 |
| JP | 2009-278848 A | 11/2009 |
| WO | WO 2011054750 A1 * | 5/2011 |

OTHER PUBLICATIONS

English translation of the Office Action (Notification of Reasons for Refusal) issued on Nov. 17, 2014 by the Japanese Patent Office in corresponding Japanese Patent Application No. 2012-200088.

* cited by examiner

*Primary Examiner* — Alex W Mok
(74) *Attorney, Agent, or Firm* — Buchanan Ingersoll & Rooney PC

(57) ABSTRACT

A connection arrangement is provided for the windings of an electric machine and includes a plurality of phase connections, each phase connection including conductors, each conductor having an annular or annular sector shape and includes a plurality of connecting ends. The conductors of each phase connection are radially shifted.

8 Claims, 5 Drawing Sheets

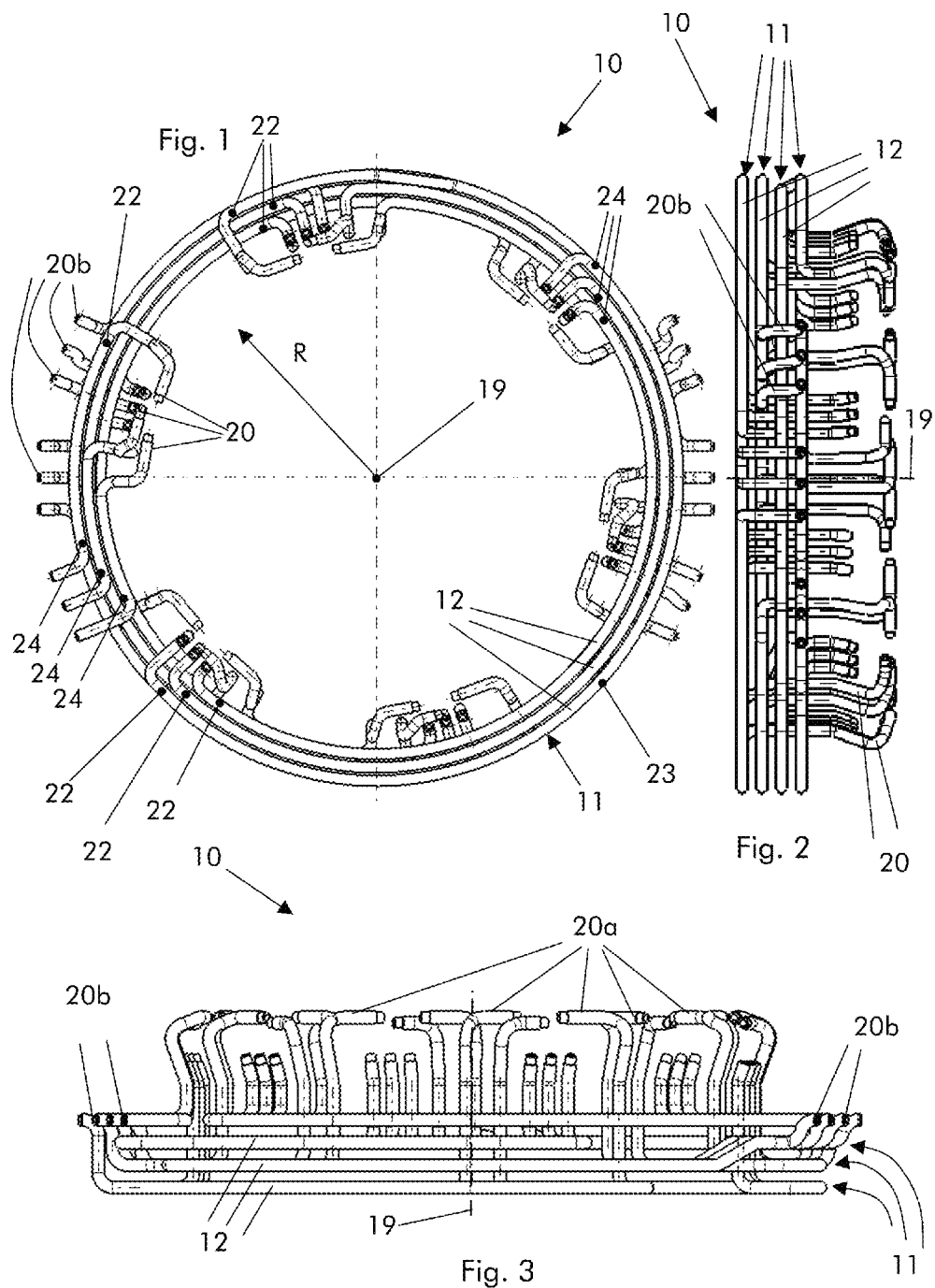

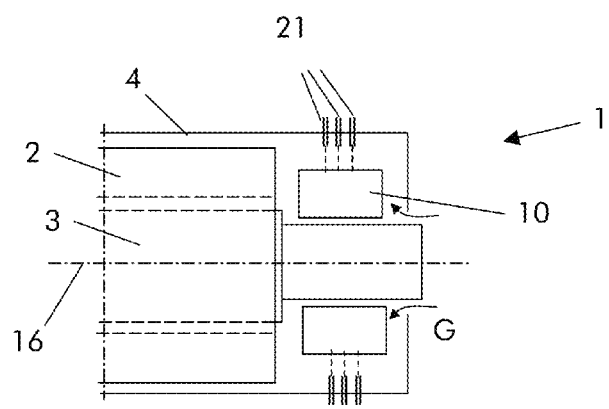
Fig. 6
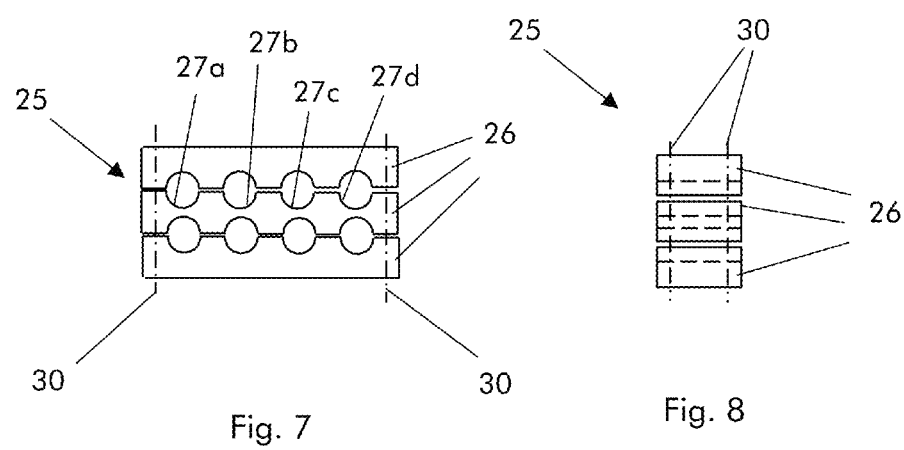
Fig. 7
Fig. 8

CONNECTION ARRANGEMENT FOR WINDINGS OF ELECTRIC MACHINES

CROSS REFERENCE TO RELATED APPLICATIONS

The present application hereby claims priority under 35 U.S.C. Section 119 to European Patent application number 11181096.6, filed Sep. 13, 2011, the entire contents of which are hereby incorporated by reference.

FIELD OF THE INVENTION

The present disclosure relates to a connection arrangement for windings of electric machines.

BACKGROUND

Electric machines have a stator and a rotor both housed in a casing.

The stator has stator windings that are connected to phase rings in turn connected to bushings penetrating the casing.

Traditionally, the stator windings include one winding for each phase (FIG. 9) and the phase rings includes one conductor for each phase.

In order to increase the power output, a plurality of parallel windings for each phase can be provided (FIG. 10); likewise phase rings with a plurality of parallel conductors for each phase can be provided.

US 2007/0188030 discloses phase rings having three phases; each phase has three axially aligned parallel conductors made of curved bars or plates.

Cooling of the conductors is achieved by the gas (hydrogen or air) circulating within the electric machine.

These phase rings proved to be satisfactory during operation, nevertheless in order to further increase the electric power output, cooling should be improved.

SUMMARY

The present disclosure is directed to a connection arrangement for windings of an electric machine. The connection arrangement includes a plurality of phase connections, each phase connection including a plurality of spaced apart conductors. The spaced apart conductors of each phase connection are radially shifted.

The present disclosure is also directed to an electric machine including a stator and a rotor. The stator has a plurality of phases; each phase has a plurality of windings, which are connected to a connection arrangement. The connection arrangement includes a plurality of phase connections, each phase connection including a plurality of spaced apart conductors. The spaced apart conductors of each phase connection are radially shifted.

BRIEF DESCRIPTION OF THE DRAWINGS

Further characteristics and advantages will be apparent from the description of a preferred but non-exclusive embodiment of the connection arrangement, illustrated by way of non-limiting example in the accompanying drawings, in which:

FIGS. 1-3 are a front view, a first side view from a first direction and a second enlarged side view from a second direction (the second direction is at 90 degree to the first direction) of the connection arrangement.

FIG. 6 schematically shows an end part of an electric machine with the connection arrangement, FIGS. 7 and 8 show a front view and a side view of a support of the connection arrangement;

DETAILED DESCRIPTION OF THE PREFERRED EMBODIMENTS

Introduction to the Embodiments

Figure 4:
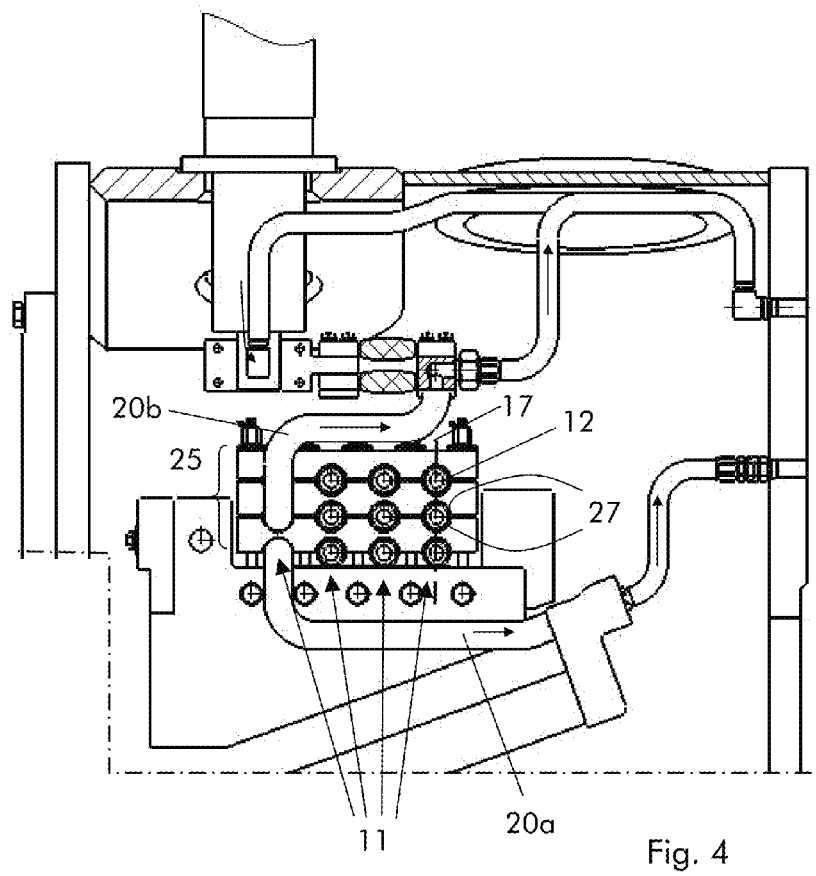
FIG. 4 shows a portion of an electric machine with the connection arrangement according to the disclosure.
Figure 5:
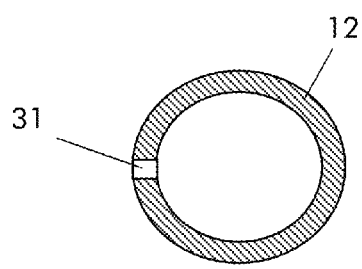
FIG. 5 shows a cross section of a conductor.
Figure 9:
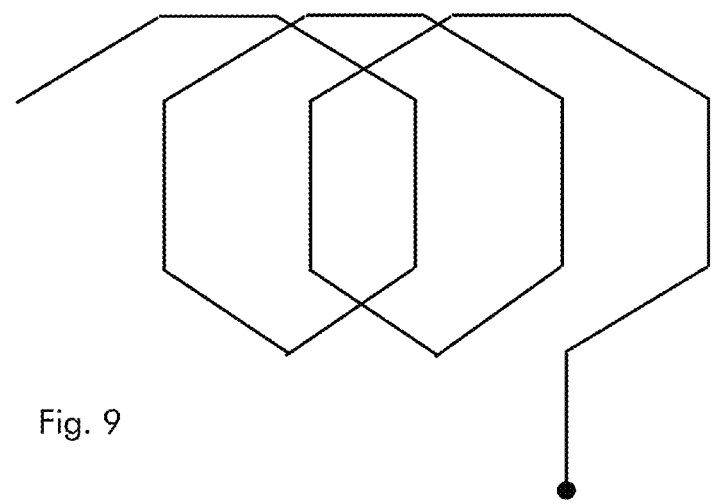
FIGS. 9 and 10 show a winding schemes of one phase including one winding per phase and three windings per phase.
Figure 10:
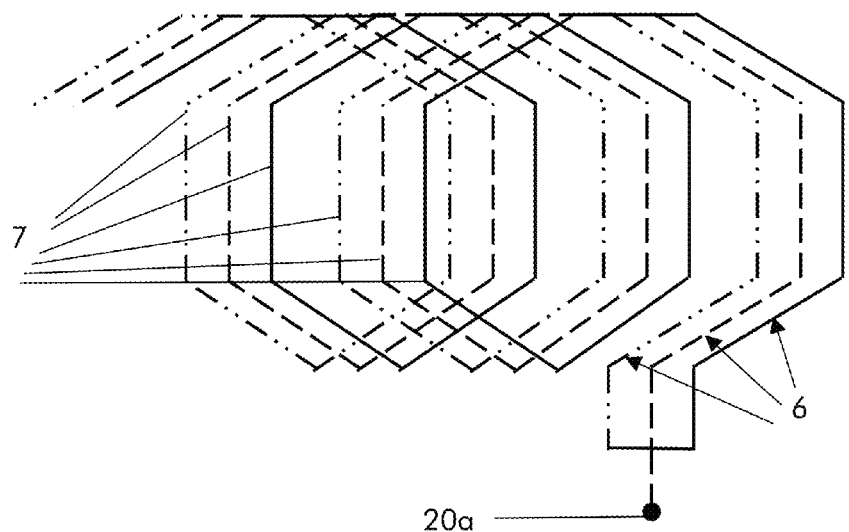

An aspect of the present disclosure thus includes providing a connection arrangement by which an improved cooling is achieved.

This and further aspects are attained by providing a connection arrangement in accordance with the accompanying claims.

Advantageously, the connection arrangement has a small axial size.

DETAILED DESCRIPTION

The electric machine 1 can be in different embodiments an electric generator or electric motor; in the following reference to an electric generator such as a synchronous electric turbo-generator (i.e. a generator to be connected to a gas or steam turbine) is made.

The electric machine 1 comprises a stator 2 and a rotor 3 both housed in a casing 4.

The stator 3 has a plurality of phases (for example it is a three-phase stator or a poly-phase stator with more than three phases).

Each phase has a plurality of windings 6 each comprising a plurality of bars 7 (housed in slots of the stator 2).

The windings 6 are connected to a connection arrangement 10 for the windings of the electric machine 1.

The connection arrangement 10 comprises a plurality of phase connections 11 and each phase connection 11 includes a plurality of conductors 12. FIG. 4 shows a cross section of the connection arrangement 10 at a position along a line IV-IV of FIG. 11; in FIG. 11 each line (that represents a phase connection 11) indicates a plurality of conductors 12 (in the example shown three conductors 12 as shown in FIG. 4, it is clear that they can also be two or more than three).

The conductors 12 are spaced far apart from each other and are electrically parallel conductors.

Each conductor 12 has an annular or annular sector shape that preferably defines a radial direction R and comprises connecting ends 20a, 20b.

The conductors 12 of each phase connection 11 are radially shifted (i.e. they have different distances from a longitudinal axis 16 of the electric machine 1 and from a longitudinal axis 19 of the connection arrangement 10).

Advantageously, the radially shifted conductors 12 are radially stacked; i.e. the conductors 12 of each phase connection 11 substantially lie in one plane 17 that is perpendicular to the longitudinal axis 19 of the connection arrangement 10 (this axis 19 overlaps the axis 16).

The plurality of connecting ends comprises inside connecting ends 20a for the windings 6, and outside connecting ends 20b for bushings 21 (the bushings 21 connect the inside of the casing 4 to the outside thereof).

The conductors 12 and preferably also the connecting ends 20a, 20b have a tubular shape to let a cooling medium pass through them to cool them.

The cooling medium can reach the conductors 12 and/or moves away from them via the connecting ends 20a, 20b, nevertheless this feature is not mandatory.

Figure 11:
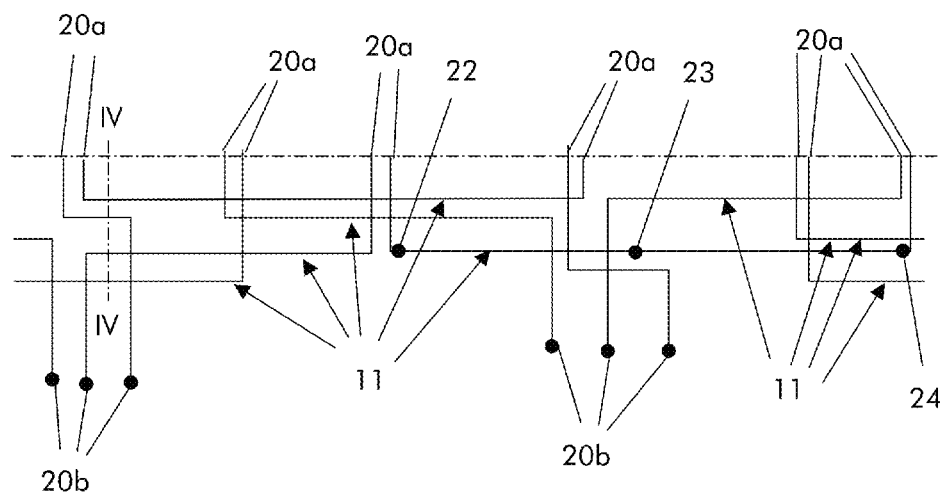
FIG. 11 is a schematic view of the connection arrangement.

In addition or as an alternative, the conductors 12 and/or the connecting ends 20a, 20b can have apertures 22, 23, 24 connecting the inside of the conductors 12 to the outside thereof. These apertures 22-24 allow the cooling gas contained in the inside of the electric machine to enter the conductors to cool them. FIG. 11 shows for one phase connection 11 (i.e. the three conductors 12 constituting it) the positions where the apertures can be provided.

The conductors 12 of different phase connections 11 are axially adjacent to one another (see FIG. 4).

The connection arrangement 10 also includes a number of supports 25 for the conductors 12; the supports 25 are circumferentially apart from one another and can have the same distance or also different distances from one another.

Each support 25 includes a plurality of yokes 26 each having seats 27 for the conductors 12.

In particular, different seats 27a, 27b, 27c, 27d of each yoke 26 are arranged to house conductors 12 of different phase connections 11 (see FIG. 8).

For example the yokes 26 are connected to each other by bolts 30 or other removable components.

The operation of the connection arrangement is substantially the following.

Each conductor 12 is connected to the windings 6 and can also be connected to the bushings 21 (FIG. 11).

The connection arrangement 10 allows a substantial cooling and can thus carry a large electric power.

Substantial cooling is achieved first because of the conductor's disposition; the radially stacked conductors 12 and the distance between axially adjacent conductors of different phases (for electrical reasons) guarantee large impingement of the cooling gas G circulating within the generator; this allows substantial cooling of all the conductors 12.

In addition, the tubular shape of the conductors 12 allows cooling medium to pass through the conductors 12 to further increases the cooling.

The cooling medium passing through the conductors 12 can be the same cooling gas G of the generator. In the drawings LP indicates a generator's zone at lower pressure and HP a generator's zone at higher pressure; in addition 31 indicates Polytetrafluoroethylene (PTFE) or Teflon® pipes that are used to allow cooling medium circulation from the inside of the generator (HP zone) via the conductors 12 and the connecting ends 20a, 20b to the LP zone.

In a first example, gas can enter the conductors 12 via the apertures 23 at their central part (these apertures open in the HP zone) and exit via the apertures 22, 24 at the ends of the conductors 12 (these apertures are connected via Teflon® pipes 31 to the LP zone).

In a second example, gas can enter the conductors 12 via apertures 22, 24 at their ends (these apertures open in the HP zone) and exit via apertures 23 at the central part thereof (these apertures 23 are connected via Teflon® pipes 31 to the LP zone).

In a third example, gas can enter the conductors 12 via apertures 22 at one of their ends (these apertures open in the HP zone) and exit via apertures 24 at the other ends (these apertures 24 are connected via Teflon® pipes 31 to the LP zone).

The particular disposition with the radially stacked conductors reduces the axial size of the connection arrangement 10, such that an axially larger active part (for a given generator's length) or an axially smaller generator (for a given active part's length) can be manufactured.

In practice the materials used and the dimensions can be chosen at will according to requirements and to the state of the art.

It is understood, therefore, that this invention is not limited to the particular embodiments disclosed, but is intended to cover all modifications which are within the spirit and scope of the invention as defined by the appended claims; the above description; and/or shown in the attached drawings.

REFERENCE NUMBERS 1 electric machine
2 stator
3 rotor
4 casing
6 windings of 2
7 bars of 6
10 connection arrangement
11 phase connections of 10
12 conductors of 11
16 longitudinal axis of 1
17 plane
19 longitudinal axis of 10
20a inside connecting end of 12
20b outside connecting end of 12
21 bushings
22 apertures
23 apertures
24 apertures
25 support
26 yoke of 25
27 seat of 26
27a . . . 27d seat of 26
30 bolt
31 Teflon pipe
C1, C2, C3 arrow
G cooling gas
HP high pressure zone
LP low pressure zone
R radial direction

The invention claimed is:

1. A connection arrangement for windings of an electric machine, the connection arrangement comprising:
a plurality of phase connections,
each phase connection including a plurality of spaced apart conductors,
wherein the spaced apart conductors of each phase connection are radially shifted, each of the spaced apart conductors has an annular or annular sector shape and comprises connecting ends, and at least a support for the conductors, each support including a plurality of yokes each having seats for the conductors projecting through the rectangular support lengthwise, and different seats of each yoke are arranged to house conductors of different phase connections, and
wherein the connecting ends pass through and project from seats of the support.

2. The connection arrangement according to claim 1, wherein the spaced apart conductors are electrically parallel conductors.

3. The connection arrangement according to claim 1, wherein the radially shifted conductors are radially stacked.

4. The connection arrangement according to claim 1, wherein the conductors of different phase connections are axially adjacent to one another.

5. The connection arrangement according to claim 1, wherein the plurality of connecting ends comprises:
   inside connecting ends for windings of the electric machine, and
   outside connecting ends for bushings of the electric machine.

6. An electric machine comprising a stator and a rotor, wherein:
   the stator has a plurality of phases,
   each phase has a plurality of windings, the windings are connected to a connection arrangement, the connection arrangement comprising:
   a plurality of phase connections, each phase connection including a plurality of spaced apart conductors,
   wherein the spaced apart conductors of each phase connection are radially shifted, each of the spaced apart conductors has an annular or annular sector shape and comprises connecting ends, and at least a support for the conductors, each support including a plurality of yokes each having seats for the conductors projecting through the rectangular support lengthwise, and different seats of each yoke are arranged to house conductors of different phase connections, and
   wherein the connecting ends pass through and project from seats of the support.

7. The electric machine according to claim 6, wherein the connecting ends have a tubular shape and have apertures for cooling.

8. The electric machine according to claim 6, wherein the electric machine is an electric generator.

* * * * *